(12) United States Patent
Scholl et al.

(10) Patent No.: US 10,379,961 B2
(45) Date of Patent: Aug. 13, 2019

(54) ENSURING METADATA AND INDEX CONSISTENCY USING WRITE INTENTS

(71) Applicant: International Business Machines Corporation, Armonk, NY (US)

(72) Inventors: Daniel J. Scholl, Chicago, IL (US); Jeremy S. Jarczyk, Lombard, IL (US); Wesley B. Leggette, Chicago, IL (US); Jason K. Resch, Chicago, IL (US); Yogesh R. Vedpathak, Chicago, IL (US); Manish Motwani, Chicago, IL (US); Tyler K. Reid, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 128 days.

(21) Appl. No.: 15/484,417

(22) Filed: Apr. 11, 2017

(65) Prior Publication Data
US 2018/0293266 A1 Oct. 11, 2018

(51) Int. Cl.
*G06F 11/00* (2006.01)
*G06F 11/14* (2006.01)
(Continued)

(52) U.S. Cl.
CPC ...... *G06F 11/1451* (2013.01); *G06F 11/1435* (2013.01); *G06F 11/2058* (2013.01); *G06F 11/1076* (2013.01); *G06F 11/1464* (2013.01); *G06F 2201/80* (2013.01); *G06F 2201/84* (2013.01)

(58) Field of Classification Search
CPC ............. G06F 11/1435; G06F 11/1451; G06F 11/2058; G06F 11/1464; G06F 11/0709; G06F 11/0727; G06F 17/30371; G06F 17/30377; G06F 2201/80; G06F 2201/84
See application file for complete search history.

(56) References Cited

U.S. PATENT DOCUMENTS

| 4,092,732 A | 5/1978 | Ouchi |
| 5,454,101 A | 9/1995 | Mackay et al. |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Joseph D Manoskey
(74) *Attorney, Agent, or Firm* — Garlick & Markison; Timothy W. Markison; Randy W. Lacasse

(57) ABSTRACT

A method for execution by one or more processing modules of one or more computing devices of a dispersed storage network (DSN), the method begins by, receiving a write data object request and writing and committing the data object as a set of encoded data slices into DSN memory. The method continues by writing and committing an index consistency write-intent to DSN memory. The method continues by writing metadata of the data object to DSN memory. The method continues by write and committing an index entry to DSN memory. The method continues, during a finalization of the index consistency write-intent, by executing the index consistency write-intent to ensure consistency between the metadata of the data object and metadata located in the index entry.

20 Claims, 10 Drawing Sheets

(51) Int. Cl.
*G06F 11/20* (2006.01)
*G06F 11/10* (2006.01)

(56) References Cited

U.S. PATENT DOCUMENTS

| | | | |
|---|---|---|---|
| 5,485,474 | A | 1/1996 | Rabin |
| 5,581,753 | A | 12/1996 | Terry et al. |
| 5,774,643 | A | 6/1998 | Lubbers et al. |
| 5,796,999 | A | 8/1998 | Azagury et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 8,364,648 | B1 * | 1/2013 | Sim-Tang ......... G06F 17/30368 707/674 |
| 8,560,079 | B2 | 10/2013 | Capcelea et al. |
| 8,572,031 | B2 | 10/2013 | Merriman et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma et al. |
| 2005/0100022 | A1 | 5/2005 | Ramprashad |
| 2005/0108481 | A1 | 5/2005 | Iyengar et al. |
| 2005/0114594 | A1 | 5/2005 | Corbett et al. |
| 2005/0125593 | A1 | 6/2005 | Karpoff et al. |
| 2005/0131993 | A1 | 6/2005 | Fatula, Jr. |
| 2005/0132070 | A1 | 6/2005 | Redlich et al. |
| 2005/0144382 | A1 | 6/2005 | Schmisseur |
| 2005/0223043 | A1 * | 10/2005 | Randal ............. G06F 17/30315 |
| 2005/0229069 | A1 | 10/2005 | Hassner |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll, Jr. |
| 2007/0079081 | A1 | 4/2007 | Gladwin et al. |
| 2007/0079082 | A1 | 4/2007 | Gladwin et al. |
| 2007/0079083 | A1 | 4/2007 | Gladwin et al. |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0226235 | A1 * | 9/2007 | Fuh .................. G06F 17/30371 |
| 2007/0234110 | A1 | 10/2007 | Soran et al. |
| 2007/0283167 | A1 | 12/2007 | Venters, III et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2014/0298136 | A1 * | 10/2014 | Resch ................ G06F 11/1076 714/763 |
| 2018/0210914 | A1 * | 7/2018 | Huang ............. G06F 17/30581 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner distributed, or dispersed, storage network (DSN) 10

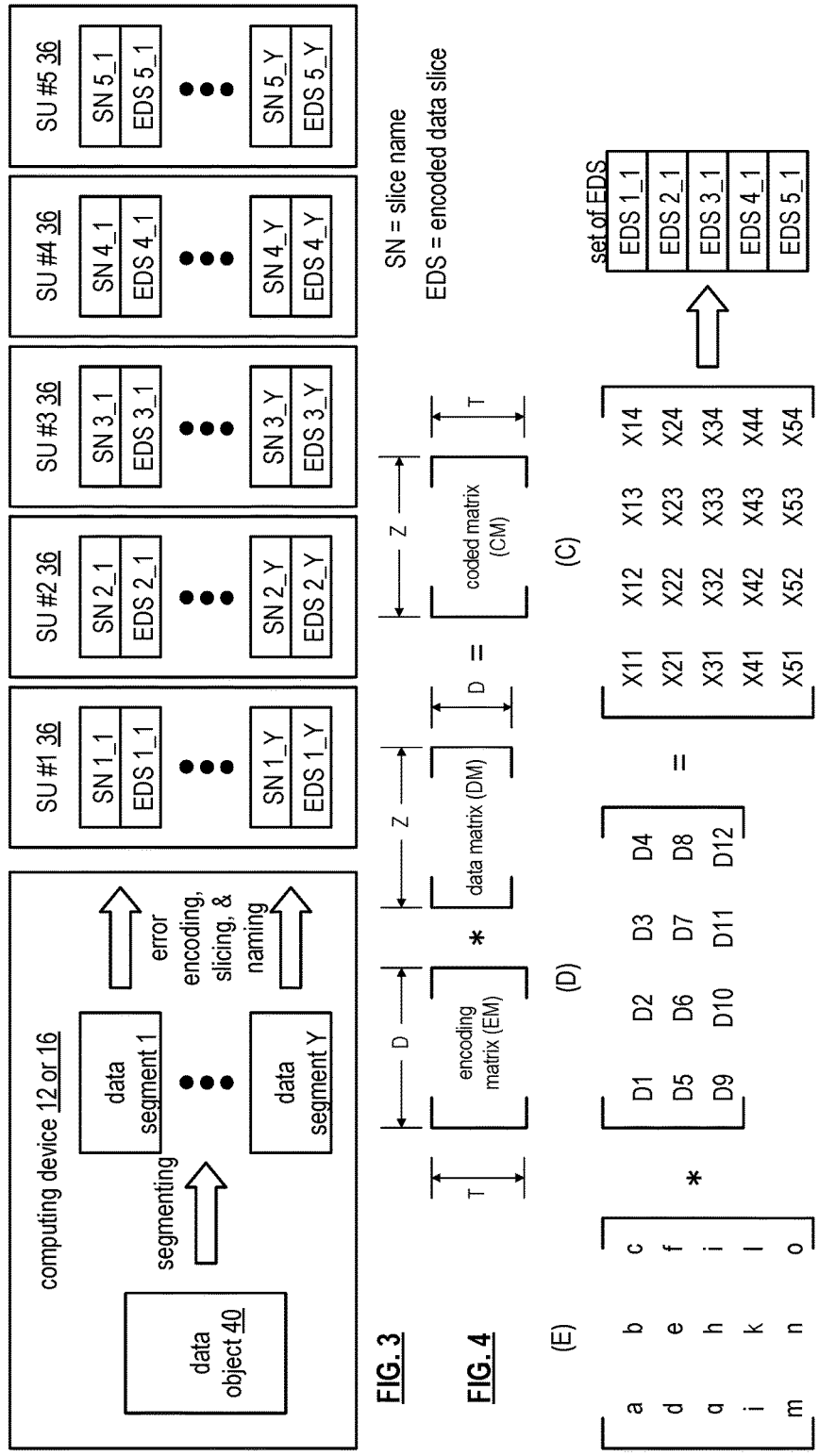

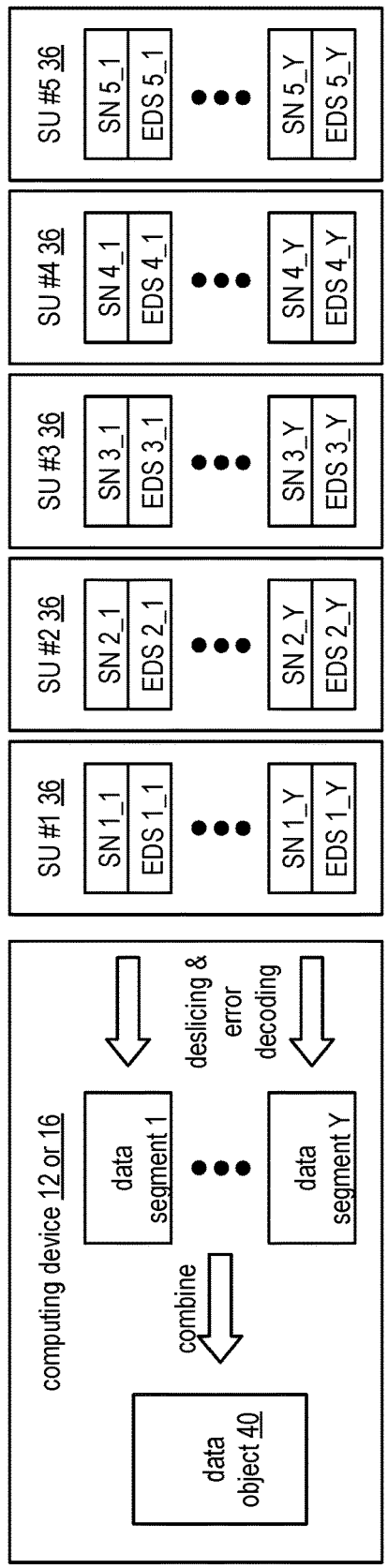

ENSURING METADATA AND INDEX CONSISTENCY USING WRITE INTENTS

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 7 is a schematic block diagram of an example of dispersed storage error decoding of data in accordance with the present invention;

FIG. 8 is a schematic block diagram of a generic example of an error decoding function in accordance with the present invention;

DETAILED DESCRIPTION OF THE INVENTION

Figure 1:
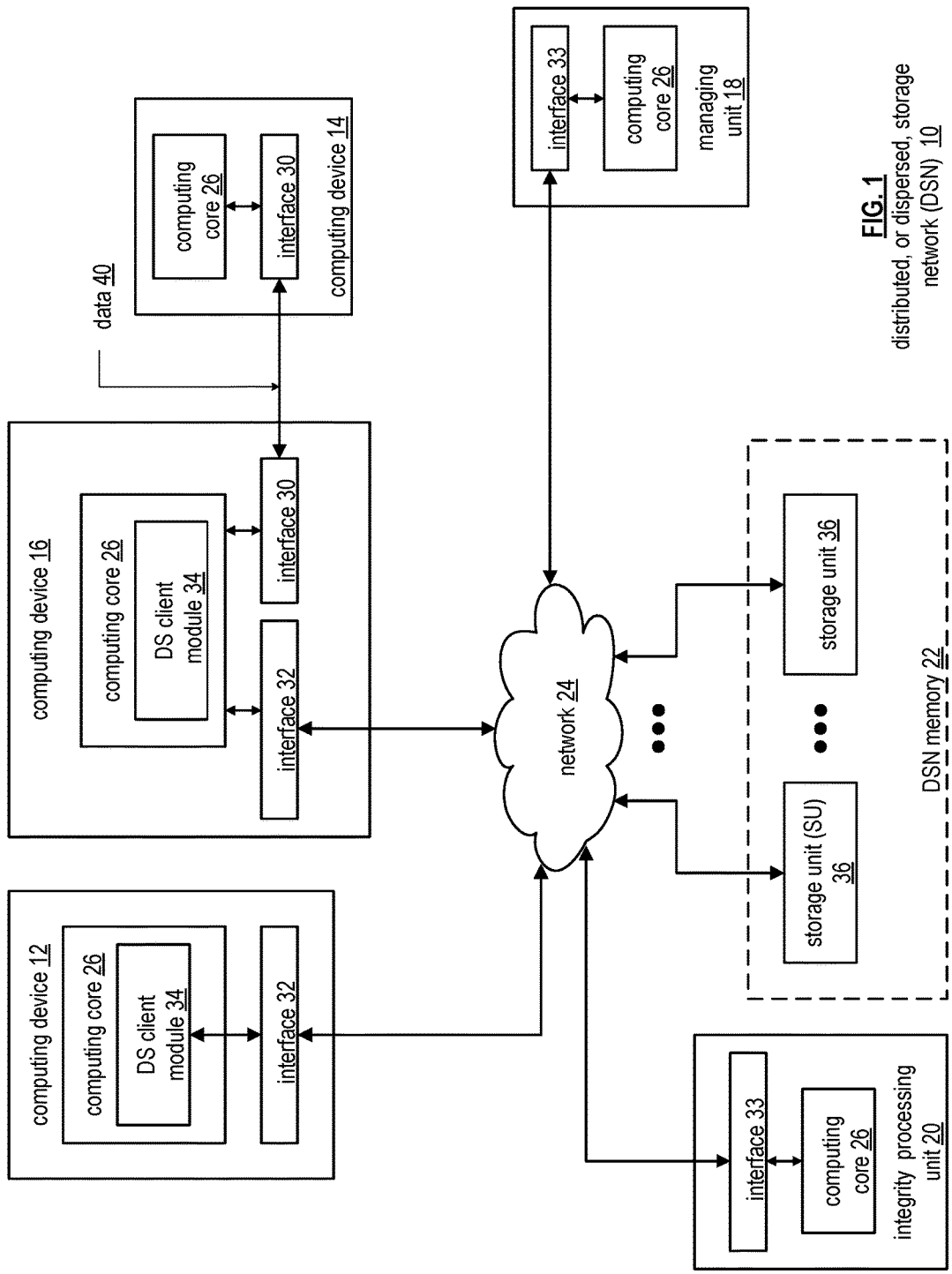
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
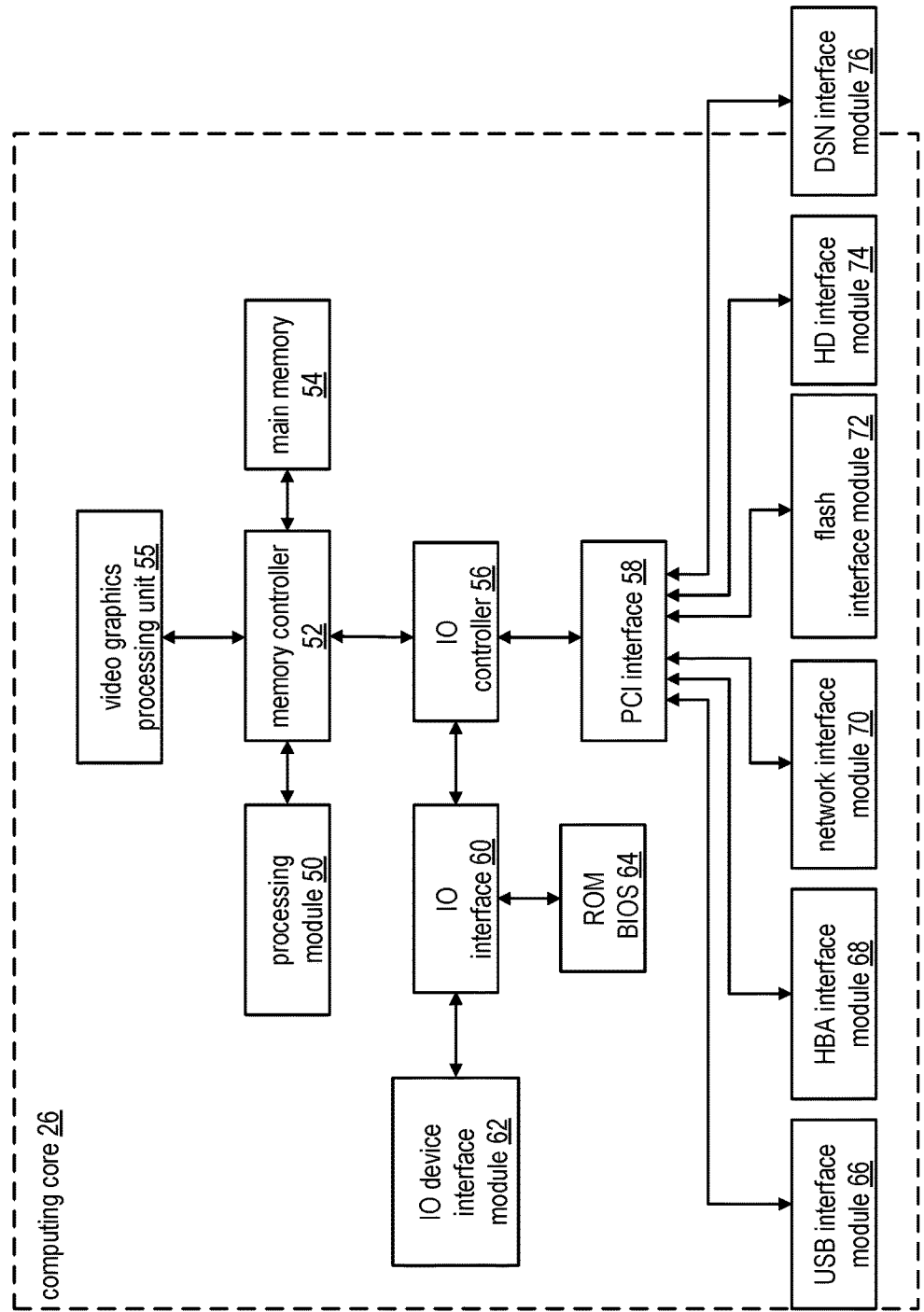
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/ or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSTN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSTN managing unit 18 tracks the number of times a user accesses a non-public vault and/or public vaults, which can be used to generate per-access billing information. In another instance, the DSTN managing unit 18 tracks the amount of data stored and/or retrieved by a user device and/or a user group, which can be used to generate per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSTN memory 22.

FIG. 2 is a schematic block diagram of an embodiment of a computing core 26 that includes a processing module 50, a memory controller 52, main memory 54, a video graphics processing unit 55, an input/output (TO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

In embodiments of DSN memory described herein, "Eventual Consistency Intents" are small objects that can be stored in a DSN memory to ensure that a piece of work eventually gets done (i.e., does not have to be performed immediately). A DSN processing unit will generally write these intents along with an immediate consistency update, and return a response to the user before moving on to processing the eventual consistency update. For example, a check of potential encoded data slice names within a range of slice names includes common encoded data slice identifiers consistent with a particular pillar of a vault. Once the DSN processing unit finishes the eventual consistency update in the background, it deletes the intent from the DSN memory. If, however, the DSN processing unit crashes or runs into a network partition which prevents it from accomplishing the update, the intent will be left in DSN memory.

Figure 9A:
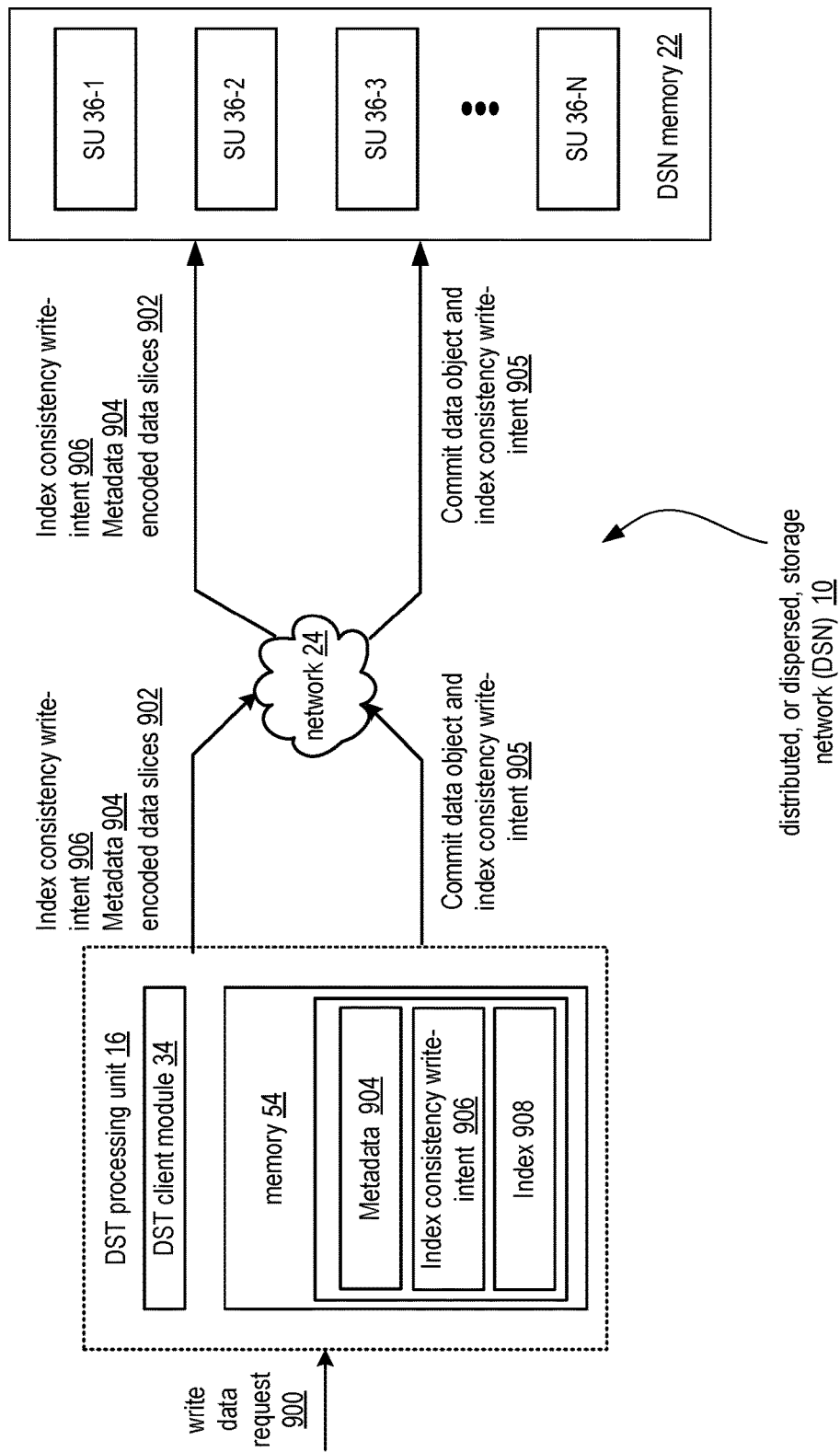
FIG. 9A is a schematic block diagram of an embodiment of ensuring metadata and index consistency using write intents in accordance with the present invention.

FIG. 9A is a schematic block diagram of an embodiment of ensuring metadata and index consistency using write intents. When performing a data object write to DSN memory 22, a processing module (e.g., client DS module 34)

identifies storage units (e.g., storage units 36-1, 36-2, 36-3, 36-N, etc.) where encoded data slices of the data object will be written. For each encoded data slice of a data segment, the grid module (FIGS. 3-5) generates a unique slice name and attaches it thereto. The slice name includes a universal routing information field and a vault specific field and may be 48 bytes (e.g., 24 bytes for each of the universal routing information field and the vault specific field). The universal routing information field includes a slice index 908, a vault ID, a vault generation, and a reserved field. The slice index 908 is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number). In addition to the slice index, metadata associated with the encoded data slices can include control information, such as size, type, date of last change, version, etc. of the encoded data slices.

As shown, a dispersed storage network (DSN) 10 includes distributed storage and task (DST) processing unit 16 (computing device) of FIG. 1, the network 24 of FIG. 1, and a set of storage units 36 (1-N) within DSN memory 22. The DST processing unit 16 includes the DST client module 34 of FIG. 1 and memory 54. The DSN functions to maintain integrity of indexes of stored data objects stored as a plurality of sets of encoded data slices 902 in the set of storage units SUS 36 (1-N) within DSN memory 22.

In an example of operation of maintaining of the integrity of the indexes, the DST client module 34 determines to store a data object (write data object) as encoded data slices in the set of storage units 36 (1-N). During a write operation, encoded data slices are sent to DSN memory 22 with an exclusive "write lock" on the slice name to prevent others from updating that slice name during the duration of the lock. For example, the DST client module 34 receives a store data request 900. Having determined to store the object, the DST client module 34 generates index consistency write-intent information 906 in order to check consistency of the index at a later time.

The index consistency write-intent information element specifies an intention that a DSN processing unit wants a consistent index with matching metadata to achieve for a write of a data object to DSN memory. At the completion of a data object write, the DS processing unit 16 creates or updates a unique metadata 904 and proposed index entry 908 for the data object. Metadata 904 may include one or more of: a size indicator of the data object, a number of regions of the data object, a region size indicator, a number of data segments per region, a slice name range, a source name associated with the identifier of the data object, the identifier of the data object, an identifier of a requesting entity, a current timestamp, and an estimated time to completion of the storing.

The DS processing unit will then write the metadata 904 and an index consistency write-intent 906 in a single transaction to DSN memory and retry on a check or conflict exception. The DS processing unit will also commit both the data object and index consistency write-intent 905. In one embodiment, the write and commit data object content and write and commit index consistency intent are processed substantially in parallel, although they may not be completed simultaneously. A commit provides visibility to the written encoded data slices for other readers of the DS memory, releases exclusive "write lock" on associated slice name and allows other writers to the storage units to update the slice name.

Figure 9B:
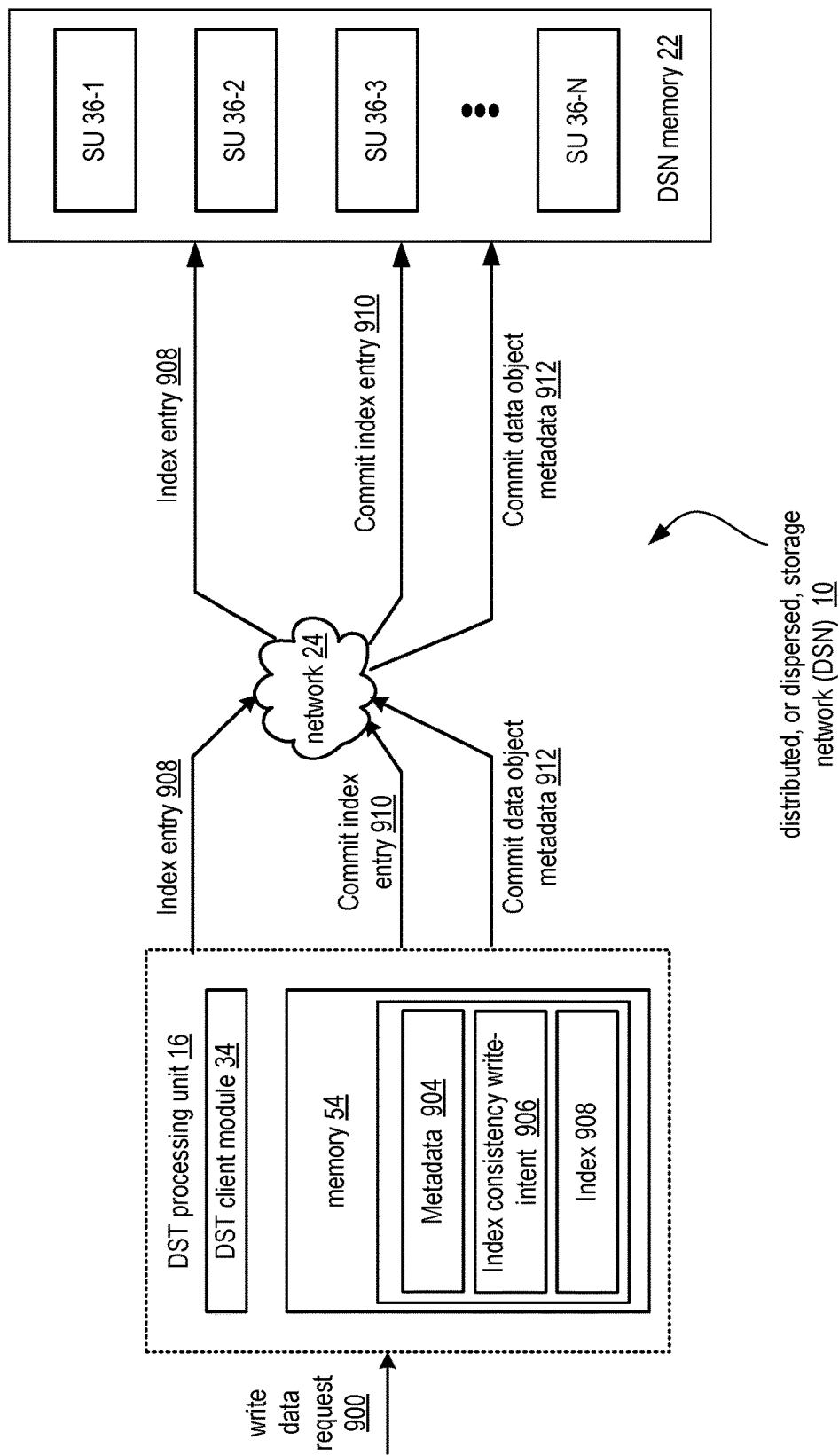
FIG. 9B is another schematic block diagram of an embodiment of ensuring metadata and index consistency using write intents in accordance with the present invention.

FIG. 9B is another schematic block diagram of an embodiment of ensuring metadata and index consistency using write intents. After the metadata is written, a proposed index entry 908 is written to DSN memory 22 and thereafter committed 910, thereby creating the index entry 908 in DSN memory. After creation of the index entry, the data object metadata is committed 912.

Figure 9C:
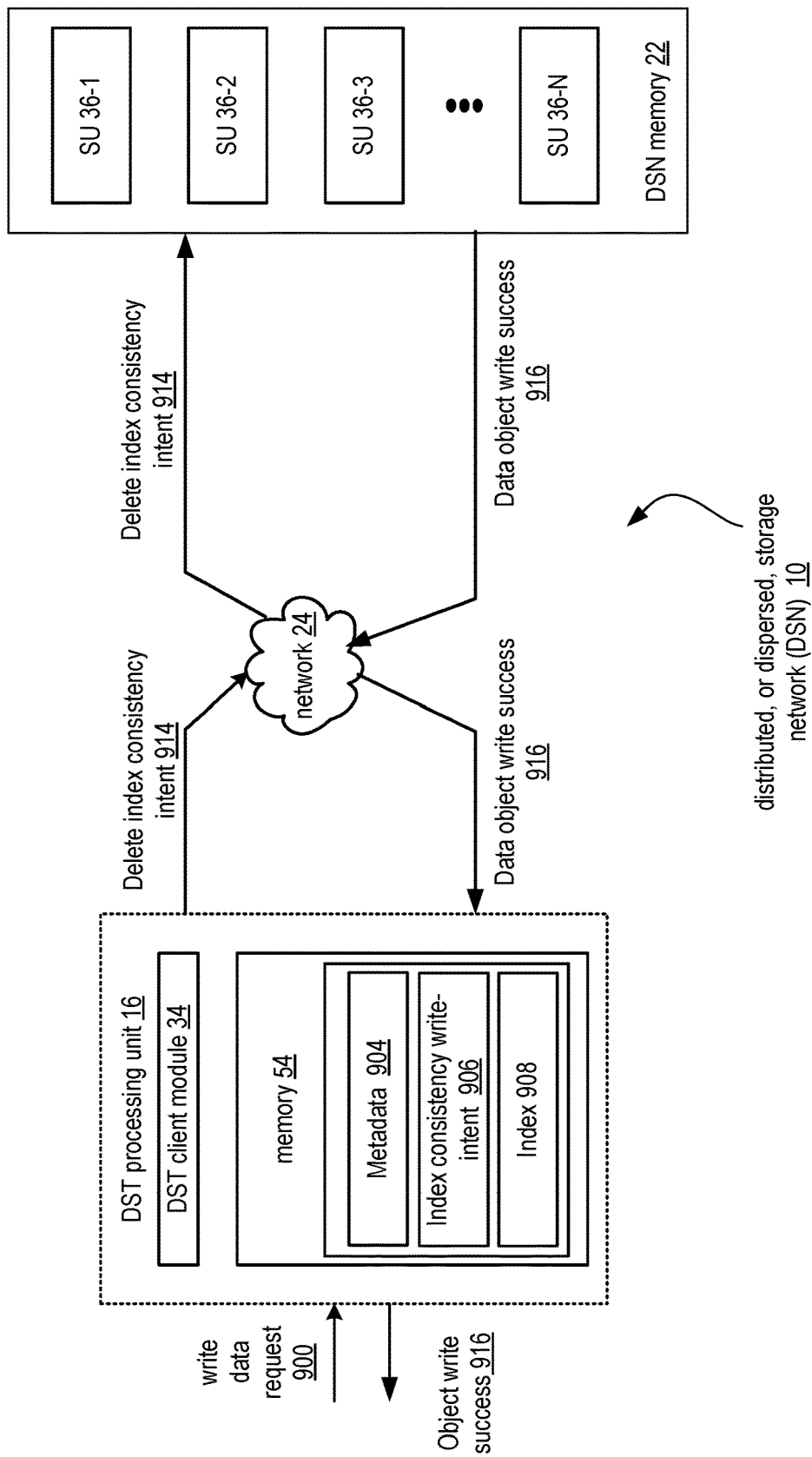
FIG. 9C is another schematic block diagram of an embodiment of ensuring metadata and index consistency using write intents in accordance with the present invention.

FIG. 9C is another schematic block diagram of an embodiment of ensuring metadata and index consistency using write intents. After the commit of the proposed index entry and data object metadata, the user (write data requestor) would be notified of a write success 916 (data object write success and the index consistency intent would be deleted from DSN memory 22 (write and commit) 914.

Figure 9D:
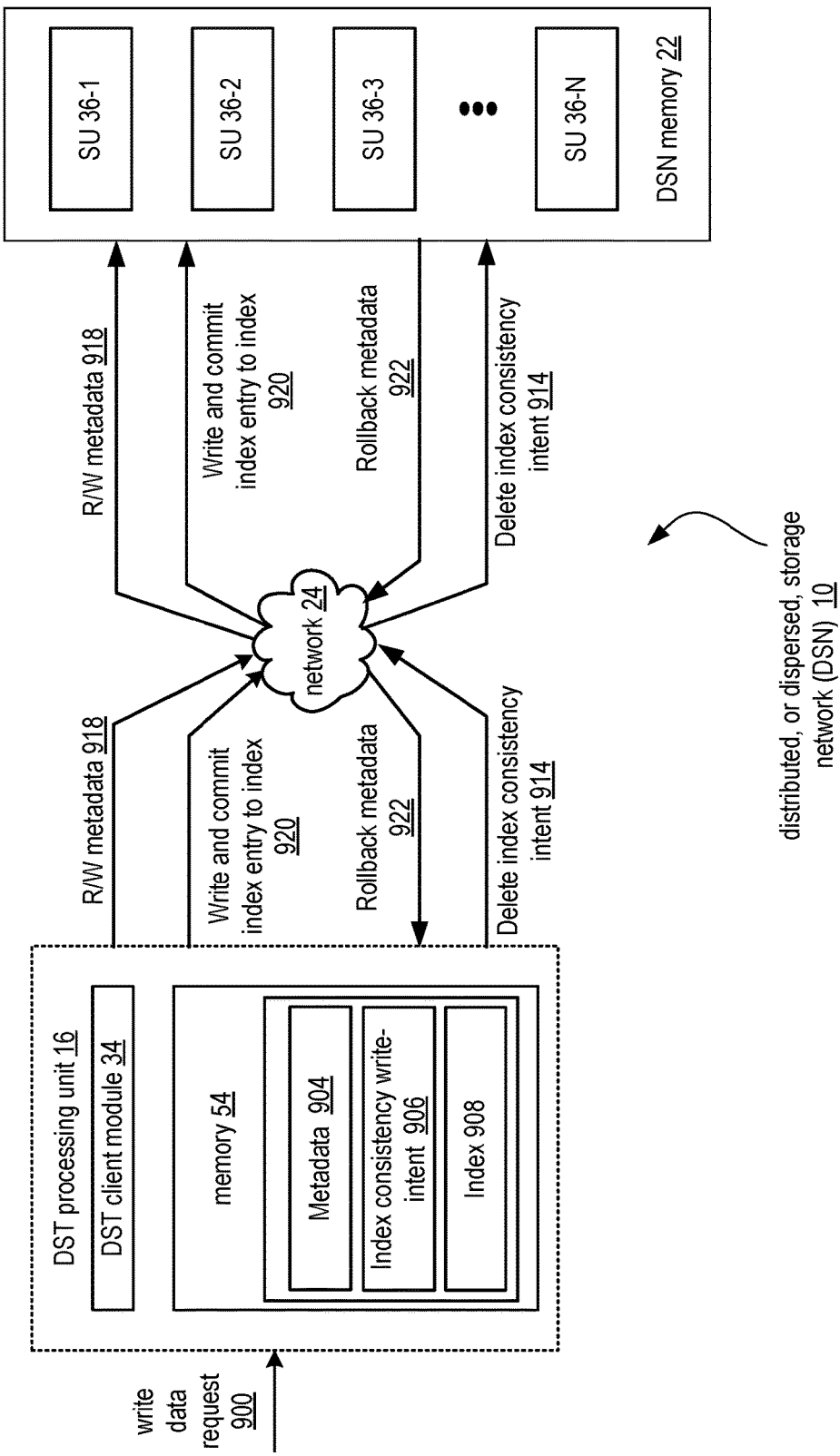
FIG. 9D is another schematic block diagram of an embodiment of ensuring metadata and index consistency using write intents in accordance with the present invention.

FIG. 9D is another schematic block diagram of an embodiment of ensuring metadata and index consistency using write intents. If, during processing of the data object, metadata and/or index, a failure or crash occurs, a cleanup agent process (FIG. 9F) is used to maintain consistency. DST processing unit 16 reads/writes (R/W) metadata 918 of the data object to generate an index entry to be written to DSN memory or possible be deleted from DSN memory (discussed further hereafter) and thereafter to lock it. DST processing unit then writes and commits the index entry to index 920 (or deletes the index entry if the metadata didn't exist). For example, asynchronously, during a finalization of index consistency intent 906, the index consistency write-intent would be executed to ensure consistency (correlation) between the data object metadata and metadata located in the index entry. If, during the processing of the index consistency write-intent, a differing metadata (different than metadata 904) was encountered, or a differing expected revision (unexpected revision), the cleanup processing agent (associated with DST processing unit 16 or optionally associated with integrity processing unit 20) would handle the discrepancy by rolling back the metadata 922, otherwise the index consistency intent 906 would self-destruct (be deleted 914) as no action was required. In one embodiment, rolling back the metadata unlocks encoded data slices that were written with a "write" and rolls back changes made by that "write".

Figure 9E:
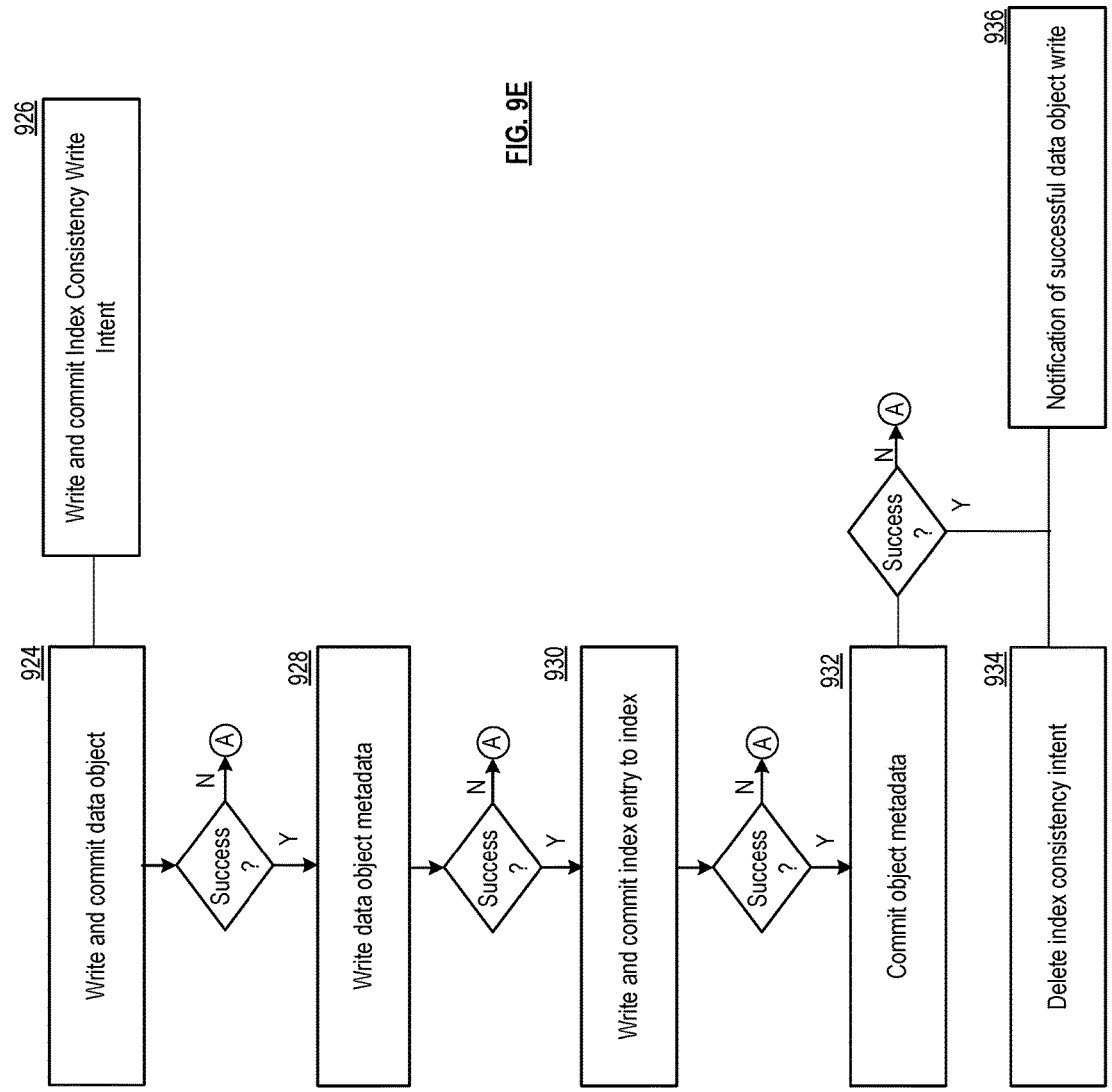
FIG. 9E is a logic diagram of an example of ensuring metadata and index consistency using write intents in accordance with the present invention.
Figure 9F:
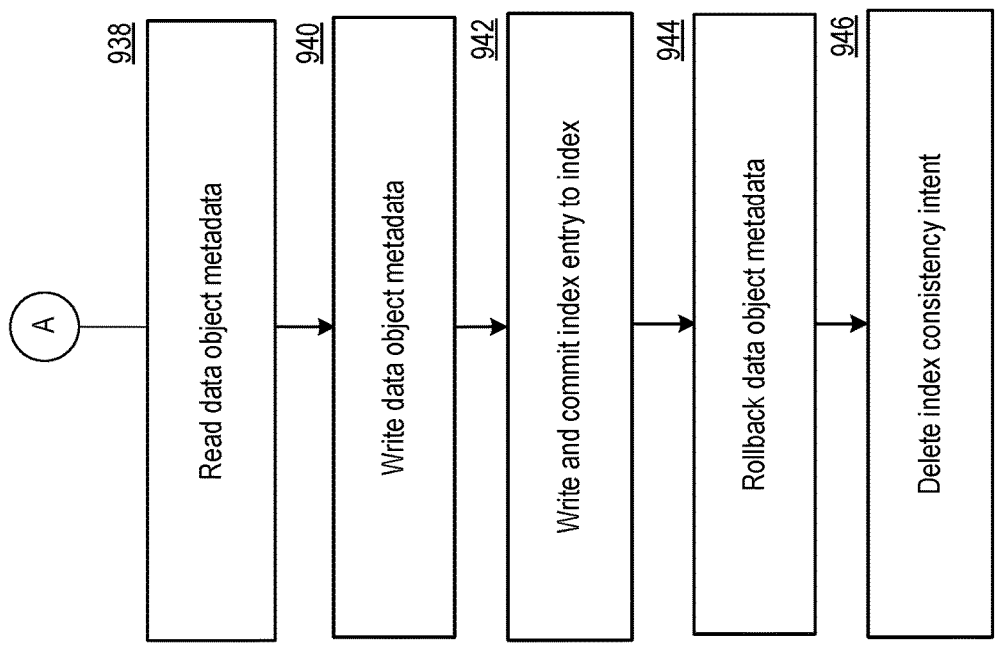
FIG. 9F is a logic diagram of an example of ensuring metadata and index consistency using write intents in accordance with the present invention.

FIG. 9E is a flowchart illustrating an example diagram of ensuring metadata and index consistency using index consistency intents. In particular, a method is presented for use in conjunction with one or more functions and features described in conjunction with FIGS. 1-2, 3-8, and also FIGS. 9A-9F. The method includes step 924, where a processing module (e.g., of a distributed storage and task (DST) client module 34) receives a write data object request (900) and writes and commits the data object as a set of encoded data slices into DSN memory 22 (storage units (SUs) 36-1 through 36-N). In parallel, the method continues at step 926, where DST processing unit then writes and commits the index consistency write-intent. If the data object and index consistency write-intent write and commit steps are not successfully completed (committed), cleanup agent process (A), as shown in FIG. 9F, is used to maintain consistency.

If the data object and index consistency write-intent write and commit steps are successfully completed (committed), the method continues at step 928, where the processing module writes the data object metadata to DSN memory 22. If the write data object metadata step is not successfully completed (stored in DSN memory 22), cleanup agent process (A), as shown in FIG. 9F, is used to maintain consistency.

If the write data object metadata step is successfully completed (stored in DSN memory 22), the method continues at step 930, where the processing module generates (writes) an index entry to be written to DSN memory 22 and thereafter locks it (commits). If the write index entry step is not successfully completed (stored/committed in DSN memory 22), cleanup agent process (A), as shown in FIG. 9F, is used to maintain consistency.

If the write index entry step is successfully completed (stored/committed in DSN memory 22), the method continues at step 932, where the processing module commits the data object metadata to DSN memory 22. If the committing of the data object metadata to DSN memory 22 step is not successfully completed (stored/committed in DSN memory 22), cleanup agent process (A), as shown in FIG. 9F, is used to maintain consistency.

If the committing of the data object metadata to DSN memory 22 step is successfully completed (stored/committed in DSN memory 22), the method continues at step 934, where the processing module deletes the index consistency write-intent and, in parallel, in step 936, notifies a write data requestor (e.g., user) of a successful data object write.

FIG. 9F is a flowchart illustrating an example diagram of ensuring metadata and index consistency using index consistency intents. In particular, a method is presented for use in conjunction with one or more functions and features described in conjunction with FIGS. 1-2, 3-8, and also FIGS. 9A-9F. The method includes step 938, where a processing module (e.g., of a distributed storage and task (DST) client module 34) reads the data object metadata to generate an index entry to be written to DSN memory or possibly be deleted from DSN memory.

The method continues at step 940, where the processing module writes the data object metadata to DSN memory 22 to lock it (e.g., slice name protected from other uses). The method continues at step 942, where the processing module writes and commits the index entry to index (or deletes the index entry if the metadata didn't exist). For example, asynchronously, during a finalization of index consistency intent 906, the index consistency write-intent would be executed to ensure consistency (correlation) between the data object metadata and metadata located in the index entry. If, during the processing of the index consistency write-intent, a differing metadata (different than metadata 904) was encountered, or a differing expected revision, the cleanup processing agent (associated with DST processing unit 16 or optionally associated with integrity processing unit 20) would handle the discrepancy by rolling back the metadata in step 944, otherwise, in step 946, the index consistency intent 906 would self-destruct (be deleted) as no action was required.

The method described above in conjunction with the processing module can alternatively be performed by other modules of the dispersed storage network or by other computing devices. In addition, at least one memory section (e.g., a non-transitory computer readable storage medium) that stores operational instructions can, when executed by one or more processing modules of one or more computing devices of the dispersed storage network (DSN), cause the one or more computing devices to perform any or all of the method steps described above.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method for execution by one or more processing modules of one or more computing devices of a dispersed storage network (DSN), the method comprises:
    receiving a write data object request;
    writing and committing the data object as a set of encoded data slices into DSN memory;
    writing and committing an index consistency write-intent to DSN memory, wherein the index consistency write-intent specifies an intention to check, at a later time, for a consistent index with matching metadata associated with the data object;
    writing metadata of the data object to DSN memory;
    writing and committing an index entry to DSN memory;
    committing the metadata of the data object to DSN memory;
    deleting the index consistency write-intent; and
    notifying a write data object requestor of a successful data object write.

2. The method of claim 1 further comprises, if during processing of the index consistency write-intent, metadata different from the metadata of the data object was encountered, determining that a discrepancy has occurred.

3. The method of claim 1 further comprises, if during processing of the index consistency write-intent, metadata different from the metadata of the data object was encountered, rolling back the metadata.

4. The method of claim 1 further comprises, if during processing of the index consistency write-intent, an unexpected revision value was encountered, determining that a discrepancy has occurred.

5. The method of claim 1 further comprises, if during processing of the index consistency write-intent, an unexpected revision value was encountered, rolling back the metadata.

6. The method of claim 1, wherein during a finalization of the index consistency write-intent, the index consistency write-intent would be executed to ensure consistency between the metadata of the data object and metadata located in the index entry.

7. The method of claim 1 further comprises, when the writing and committing the data object as a set of encoded data slices into DSN memory is unsuccessful, cleanup processing including:
reading the metadata of the data object to generate an index entry to be written to DSN memory;
writing the metadata of the data object to the DSN memory to lock it;
writing and committing the index entry to an index;
rolling back the metadata; and
deleting the index consistency write-intent.

8. The method of claim 1 further comprises, when the writing and committing an index consistency write-intent to DSN memory is unsuccessful, cleanup processing including:
reading the metadata of the data object to generate an index entry to be written to DSN memory;
writing the metadata of the data object to the DSN memory to lock it;
writing and committing the index entry to an index;
rolling back the metadata; and
deleting the index consistency write-intent.

9. The method of claim 1 further comprises, when the writing the metadata of the data object to DSN memory is unsuccessful, cleanup processing including:
reading the metadata of the data object to generate an index entry to be written to DSN memory;
writing the metadata of the data object to the DSN memory to lock it;
writing and committing the index entry to an index;
rolling back the metadata; and
deleting the index consistency write-intent.

10. The method of claim 1 further comprises, when the writing and committing an index entry to DSN memory is unsuccessful, cleanup processing including:
reading the metadata of the data object to generate an index entry to be written to DSN memory;
writing the metadata of the data object to the DSN memory to lock it;
writing and committing the index entry to an index;
rolling back the metadata; and
deleting the index consistency write-intent.

11. The method of claim 10, wherein the index entry is deleted if the metadata of the data object was not located in the DSN memory.

12. The method of claim 1 further comprises, when the committing the metadata of the data object to DSN memory is unsuccessful, cleanup processing including:
reading the metadata of the data object to generate an index entry to be written to DSN memory;
writing the metadata of the data object to the DSN memory to lock it;
writing and committing the index entry to an index;
rolling back the metadata; and
deleting the index consistency write-intent.

13. A computing device of a group of computing devices of a dispersed storage network (DSN), the computing device comprises:
an interface;
a local memory; and
a processing module operably coupled to the interface and the local memory, wherein the processing module functions to:
receive a write data object request;
write and committing the data object as a set of encoded data slices into DSN memory;
write and committing an index consistency write-intent to DSN memory, wherein the index consistency write-intent specifies an intention to check, at a later time, for a consistent index with matching metadata associated with the data object;
write metadata of the data object to DSN memory;
write and committing an index entry to DSN memory;
commit the metadata of the data object to DSN memory;
delete the index consistency write-intent; and
notify a write data object requestor of a successful data object write.

14. The computing device of claim 13 further comprises, if during processing of the index consistency write-intent, metadata different from the metadata of the data object was encountered, determining that a discrepancy has occurred.

15. The computing device of claim 13 further comprises, if during processing of the index consistency write-intent, metadata different from the metadata of the data object was encountered, rolling back the metadata.

16. The computing device of claim 13, wherein during a finalization of the index consistency write-intent, the index consistency write-intent would be executed to ensure consistency between the metadata of the data object and metadata located in the index entry.

17. The computing device of claim 13, wherein the index consistency write-intent is written in a single transaction with the metadata of the data object.

18. A method for execution by one or more processing modules of one or more computing devices of a dispersed storage network (DSN), the method comprises:
receiving a write data object request;
writing and committing the data object as a set of encoded data slices into DSN memory;
writing and committing an index consistency write-intent to DSN memory, wherein the index consistency write-intent specifies an intention to check, at a later time, for a consistent index with matching metadata associated with the data object;
writing metadata of the data object to DSN memory;
write and committing an index entry to DSN memory; and
wherein during a finalization of the index consistency write-intent, the index consistency write-intent would be executed to ensure consistency between the metadata of the data object and metadata located in the index entry.

19. The method of claim 18 further comprises, if during finalization of the index consistency write-intent, metadata different from the metadata of the data object was encountered, rolling back the metadata of the data object.

20. The method of claim 18, wherein the index consistency write-intent is written in a single transaction with the metadata of the data object.

* * * * *